US006319563B1

(12) United States Patent
Skrabski et al.

(10) Patent No.: US 6,319,563 B1
(45) Date of Patent: Nov. 20, 2001

(54) GOLF BALL PAINTING METHOD

(75) Inventors: Walter Skrabski, San Diego; Steven C. Crast, Oceanside; Brian J. Webb, Vista; Michael G. Lucero, San Marcos; Ramon B. Dineros; Dennis O'Lenick, both of Oceanside, all of CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/456,787

(22) Filed: Dec. 8, 1999

(51) Int. Cl.$^{7}$ ........................................ C08J 7/04

(52) U.S. Cl. .................. 427/511; 427/261; 427/385.5; 427/407.1; 427/421; 427/510; 427/535; 427/536; 427/558; 427/559; 427/569

(58) Field of Search ............................ 427/510, 511, 427/535, 536, 558, 559, 569, 261, 385.5, 421, 407.1

(56) References Cited

U.S. PATENT DOCUMENTS

| | | | |
|---|---|---|---|
| 3,428,801 | | 2/1969 | Leach et al. . |
| 3,647,221 | | 3/1972 | Holley . |
| 4,361,111 | | 11/1982 | Groen . |
| 4,613,403 | | 9/1986 | Oyachi et al. . |
| 4,731,262 | | 3/1988 | Ohno et al. . |
| 4,846,098 | | 7/1989 | Kobayashi et al. . |
| 4,871,859 | | 10/1989 | Kitaoh et al. . |
| 5,029,870 | | 7/1991 | Concepcion et al. . |
| 5,106,651 | | 4/1992 | Tyger et al. . |
| 5,300,325 | | 4/1994 | Nealon et al. . |
| 5,506,004 | * | 4/1996 | Maruoka et al. . |
| 5,552,190 | | 9/1996 | Maruoka et al. . |
| 5,695,414 | | 12/1997 | Yokota . |
| 5,743,818 | | 4/1998 | Maruoka et al. . |
| 5,868,840 | | 2/1999 | Klein, II et al. . |
| 5,878,670 | | 3/1999 | Yamaguchi . |
| 5,972,111 | | 10/1999 | Anderson . |
| 5,989,644 | | 11/1999 | Williams . |
| 5,997,417 | | 12/1999 | Lutz . |
| 6,001,177 | | 12/1999 | Gendreau et al. . |

* cited by examiner

*Primary Examiner*—Bernard Pianalto
(74) *Attorney, Agent, or Firm*—Michael A. Catania

(57) ABSTRACT

A system and method for finishing a series of golf balls is disclosed herein. The system automatically transfers each of the golf balls from station to station on the system. The system has at least one coating station that has at least one spray gun that moves in relation to a golf ball being conveyed through the coating station. The spray gun moves in a track extending from a position below the golf ball to a position above the golf ball. The system has a transfer means that includes a series of transport pucks. Each transport puck has a plurality of shafts with spindles attached to the top of each of the shafts. Each spindle holds a golf ball for processing through the system. The spindles are rotated at relatively high rates during the coating process. In order to reduce tip marks on the finished golf ball, the golf balls are transferred from each spindle utilizing a high pressure gas. The system may be used to coat each golf ball with a basecoat, an indicia and a topcoat.

11 Claims, 14 Drawing Sheets

GOLF BALL PAINTING METHOD

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a system for painting golf balls. More specifically, the present invention relates to an automated system for applying a base coat, a logo indicia and a clear coat to a golf ball.

2. Description of the Related Art

Golf balls are painted to enhance durability and improve the appearance thereof. Most golf balls are painted white with a base coat, then printed with a logo indicia and covered with a clear coat. Such a procedure has been used in the golf industry for many years.

In the prior art, a chain-on-edge conveyor was used to transport the unfinished golf balls through the painting system. This led to high maintenance due to the length of the chain, the need for continuous lubrication, and inefficient chain movement necessitated by the serpentine layout of the conveyor. These prior art systems would also use pick-and-place robotics for transfer of the golf balls from one station to another thus leading to numerous pick and tray marks on the golf balls during the process. Such marks would detract from the appearance of the golf ball, sometimes rendering the golf ball unsuitable for sale, especially higher priced premium golf balls.

Prior art processes also use inefficient in-line curing ovens. The work-in-process inventory also builds up during the process due to the use of many collection hoppers and gondolas. The prior art systems also utilize ineffective cleaning procedures to maintain the equipment in working order.

Further, the prior art systems convey a golf ball past a series of stationary spray guns resulting in inefficient coating applications. The prior art systems also result in the pooling of paint or other coatings in the dimples which deters from the aerodynamic performance of the golf ball. Current dimple patterns have shallower dimples and require a specific coating thickness to achieve better aerodynamic performance of the golf ball.

Thus, there is a substantial need for a finishing system that can overcome the problems associated with the prior art systems.

BRIEF SUMMARY OF THE INVENTION

One aspect of the present invention is a method for finishing a series of golf balls. The method includes transferring the golf balls to a coating station that has a booth with a spray gun assembly within the booth. The spray gun assembly has at least one spray gun. The method also includes coating each of the golf balls with a coating through movement of the spray gun about each of the golf balls. The method also includes transferring each of the coated golf balls from the coating station to a curing station and curing each of the coated golf balls at the curing station.

Another aspect of the present invention is a system for finishing a series of golf balls having an unfinished surface.

The system includes a means for transferring each of the golf balls throughout the system, at least one coating station and a means for curing the coated golf balls. The coating station is disposed along the transferring means. The coating station has a booth, a conveyance line for transferring each of the golf balls through the booth, and at least one coating applicator for coating each of the golf balls within the booth. The one coating applicator is capable of movement transverse to the conveyance line. The curing means is disposed subsequent to the coating station.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
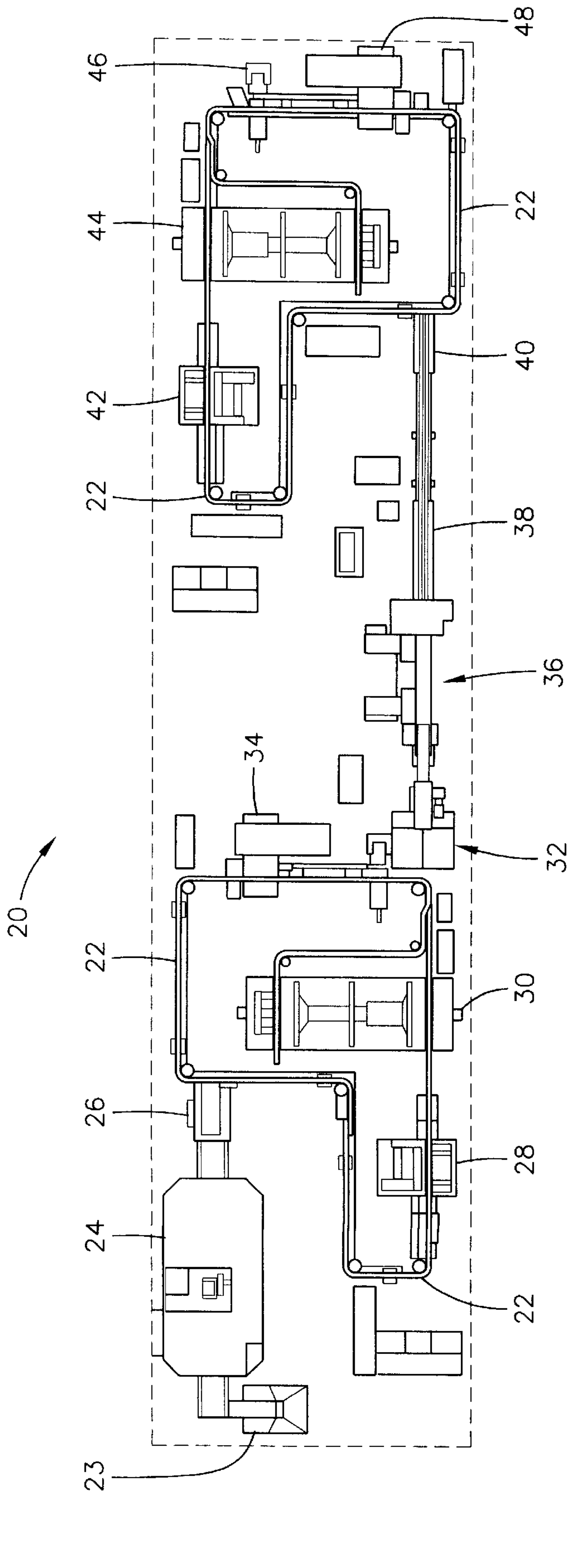
FIG. 1 is a schematic view of the golf ball painting system of the present invention.

As shown in FIG. 1, a golf ball painting system is generally designated 20. The system 20 is completely automatic thereby allowing for the finishing, or painting, of golf balls without operator involvement in the process. The system 20 includes a transfer means 22 for transferring a plurality of golf balls 25 from and to each of the stations of the system 20. The transfer means may be a conveyor system that transfers each of the golf balls 25 individually, or a conveyance system that transfers the golf balls 25 in groups throughout the system. The golf balls 25 are transferred from other processes to a collection hopper 23 for finishing of the golf ball 25 on the system 20. The other processes may include core forming processes and cover forming processes. The cover may be composed of a thermoplastic material such as an ionomer material or a thermoset material such as a polyurethane material. Prior to placement in the collection hopper 23, the golf balls 25 may be fed through a vibratory wash to remove any dust particles or other foreign matter from the surface of each of the golf balls 25.

The collection hopper 23 automatically loads the golf balls 25 onto a conveyor for transfer through a surface treatment station 24. The surface treatment station 24 increases the surface tension of the exterior of each of the golf balls 25, and chemically alters the surface material of each of the golf balls 25. The higher surface tension on the exterior of each of the golf balls 25 assures a uniform flow of paint, thereby eliminating or at least reducing pooling of paint in the dimples of each of the golf balls 25. Preferably, the surface treatment station is a plasma treatment. However, alternative surface treatments include flame ionization, flame reduction/oxidation, corona discharge, and the like. The plasma treatment process consists of bombardment of air with a high-energy electrical plasma arc that creates ionized gases that contain ions, electrons, radicals, excited molecules and atoms. The ionized gases react with the surface of each golf ball 25 to cause polymer chain scission, ablation, cross-linking and oxidation to a depth ranging from fifty to five-hundred Angstroms from the surface of the golf ball 25. Essentially highly reactive and potential bonding sites are created on the surface of the golf ball 25 in order to increase adhesion of the basecoat or primer. The plasma treatment process is performed at ambient air temperatures and at standard atmospheric conditions (25° C. and 1-atm.) as opposed to high temperature and vacuum conditions associated with conventional plasma treatment devices. The residence time in the plasma treatment station 24 may be regulated according to the chemistry requirements of the surface material. Such a plasma treatment system is described in Leach et al., U.S. Pat. No. 3,428,801, which is hereby incorporated by reference in its entirety.

After the surface treatment station 24, each of the golf balls 25 is transported at a first transfer station 26 to the transfer means 22 for conveyance to the next station. A tamping device 27, not shown, secures each golf ball 25 on the transfer means. The tamping device will be described in greater detail below. Once on the transfer means 22, each of the golf balls 25 is conveyed to a first coating station 28. At the first coating station 28, a basecoat is applied to each of the plasma treated golf balls 25. The basecoat is typically a two-component polyurethane white paint or an ultraviolet light curable paint. One example of a two-component polyurethane white paint is based on DESMODUR® polyol and urethane resins available from the Bayer Corporation of Pittsburgh, Pennsylvania. The first coating station 28 will be described in greater detail below. After the first coat or basecoat is applied to each of the golf balls 25, the golf balls 25 are conveyed by the transfer means 22 to the first curing station 30. In a preferred embodiment, the first curing station 30 is a typical convection heating oven for curing the basecoat that was previously applied to each of the golf balls 25. Alternatively, the first curing station 30 may be an ultraviolet light curing chamber. The first curing station 30 cures the golf balls 25 for application of an indicia thereon at the next station.

Figure 2:
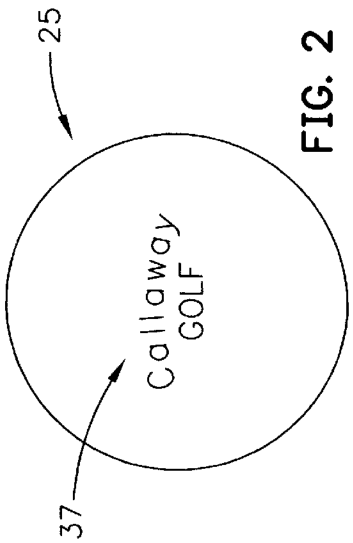
FIG. 2 is a perspective view of a golf ball finished on the system of the present invention.
Figure 4:
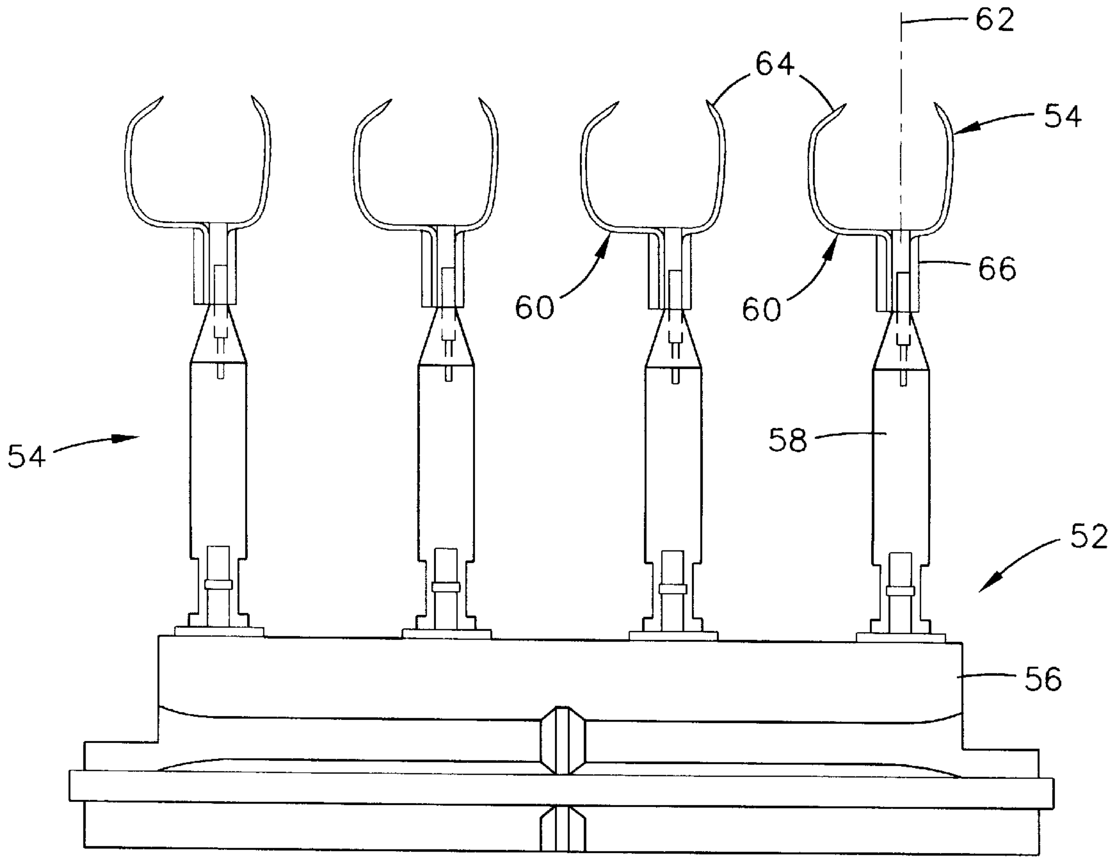
FIG. 4 is an isolated side view of a transport puck of the system of the present invention.
Figure 5:
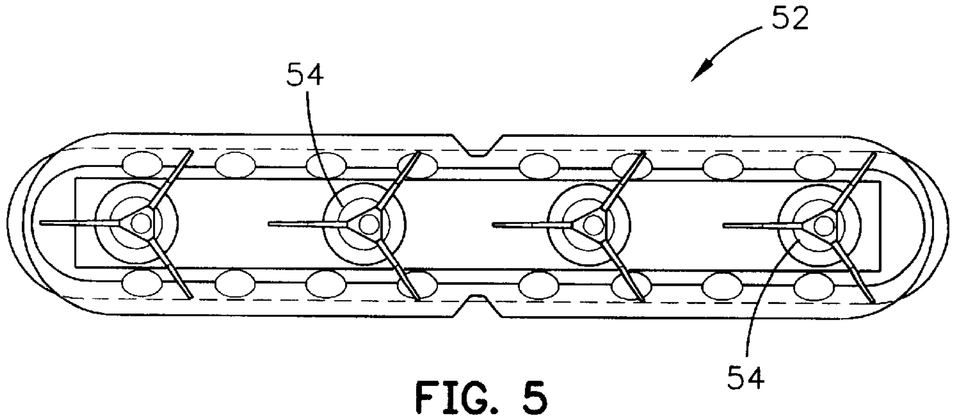
FIG. 5 is a top plan view of the transport puck of FIG. 4.

After curing, the golf balls 25 are conveyed on the transfer means 22 to the second transfer station 32. Once the golf balls 25 are unloaded at the second transfer station 32, the individual transport units, which will be described in greater detail below, may be conveyed to a changing station 34, which will be described in greater detail below. From the second transfer station 32, each of the golf balls 25 is transferred to an indicia application station 36 for application of an indicia onto each of the golf balls 25. In a preferred embodiment, the indicia application station 36 is a pad printing station. As shown in FIG. 2, each of the golf balls 25 may be marked with an indicia 37 using an ink. A preferred ink is an ultraviolet light curable ink such as UVA available from Trans Tech of Chicago, Ill. From the indicia application station 36, each of the golf balls 25 is conveyed to an indicia curing station 38. In a preferred embodiment, the indicia curing station 38 is an ultraviolet light curing station.

From the indicia curing station 38, each of the golf balls 25 is conveyed to a third transfer station 40. At the third transfer station 40, each of the golf balls 25 is transferred to the transfer means 22 for conveyance to the second coating station 42. In a preferred embodiment, the second coating station 42 is a topcoat application station. The topcoat is typically a two-component polyurethane coating that may be based on DESMODUR® polyols and urethane prepolymers available from the Bayer Corporation of Pittsburgh, Pennsylvania. Alternatively, the topcoat may be an ultraviolet light curable clearcoat. The second coating station 28 will be described in greater detail below. After the second coat or topcoat is applied to each of the golf balls 25, the golf balls 25 are conveyed by the transfer means 22 to a second curing station 44. In a preferred embodiment, the second curing station 44 is a typical convection heating oven for curing the topcoat that was previously applied to each of the golf balls 25. Alternatively, the second curing station 44 may be an ultraviolet light curing chamber. After curing, each of the golf balls 25 is conveyed to a fourth transfer station 46. At the fourth transfer station 46, the golf balls 25 are transferred from the system 20 for packaging thereof. Once the golf balls 25 are unloaded at the fourth transfer station 46, the individual transport units may be conveyed to a second changing station 48, which will be described in greater detail below.

Figure 3:
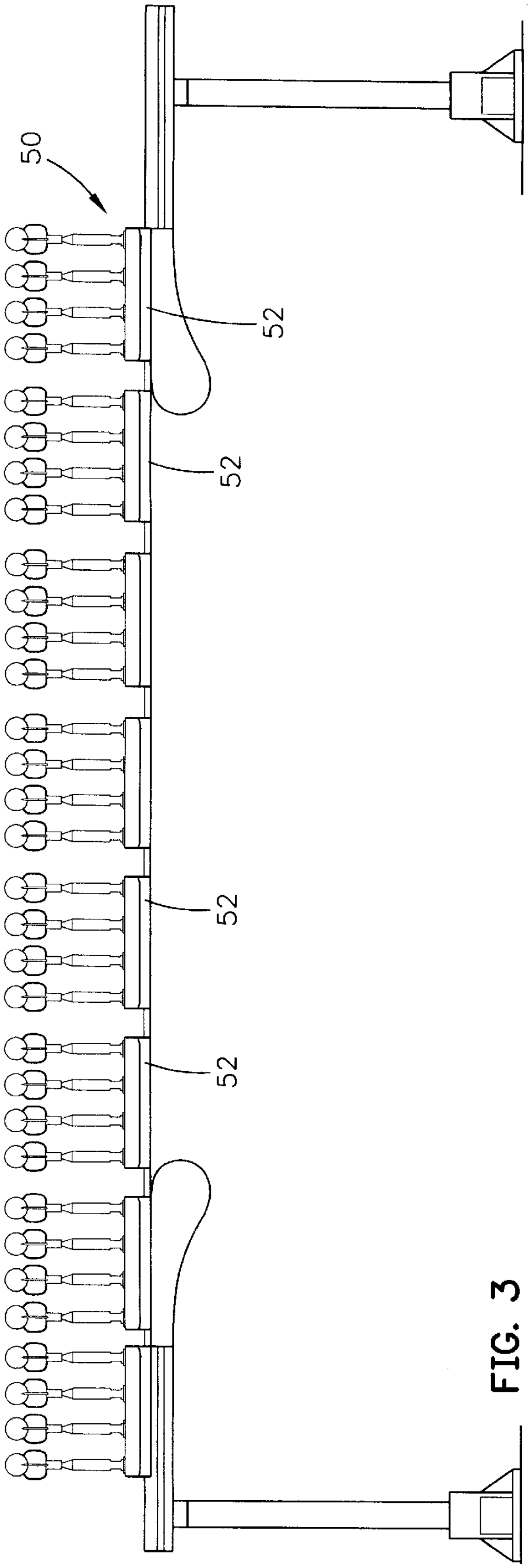
FIG. 3 is a isolated side view of a transfer means of the system of the present invention.

As illustrated in FIG. 3, the golf balls 25 are transferred along the system 20 by a transfer means 22. In a preferred embodiment, the transfer means 22 is an SKF conveyor 50 utilizing a plurality of transport pucks 52 to move groups of the golf balls 25 along the system 20. The speed of the SKF conveyor 50 is controllable for proper movement timing of the transport pucks 52 between stations. The SKF conveyor 50 is typically not enclosed and thus the transport pucks 52 are open to the environment during movement between stations. This open conveyance allows for easier maintenance of the transfer means 22. Further, the SKF conveyor 50 is modular, and thus can be structured to accommodate adjustments in the length and placement of the system 20.

As shown in FIGS. 4–8, each transport puck 52 has a plurality of golf ball holding fixtures 54 and a base 56. In a preferred embodiment, each transport puck 52 has four fixtures 54. The fixtures 54 are disposed on the base 56, and each fixture 54 may be removable or permanently attached to the base 56. Each base 56 is disposed on the SKF conveyor 50 for movement about the system 20. Each of the fixtures 54 has a shaft 58 topped with a spindle 60. Each of the spindles 60 rotates about an imaginary fixed vertical axis 62 through the center of each corresponding shaft 58. Each spindle 60 has a plurality of prongs 64 for holding a golf ball 25 as the golf ball 25 is processed through the system 20, and each spindle 60 is removable form each corresponding shaft 58. The prongs 64 project upward from a spindle base 66, and are shaped to accommodate a golf ball 25. In a preferred embodiment, each of the spindles 60, including the prongs 64 and the base 66, is composed of a glass-filled nylon material.

Figure 6:
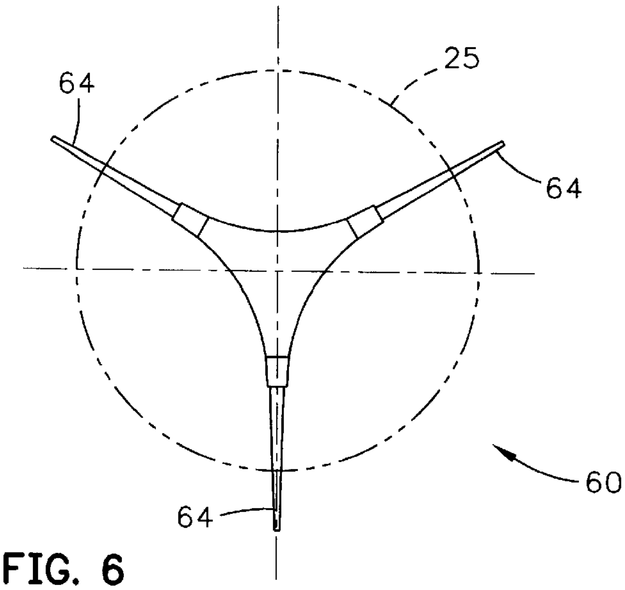
FIG. 6 is an isolated top plan view of a spindle of the system of the present invention.
Figure 7:
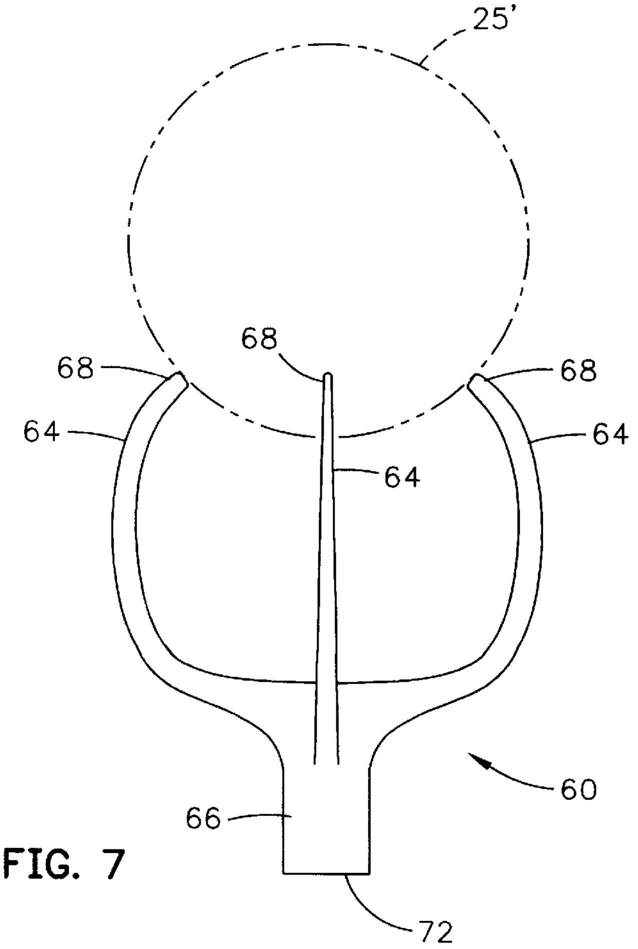
FIG. 7 is a side plan view of the spindle of FIG. 6.
Figure 8:
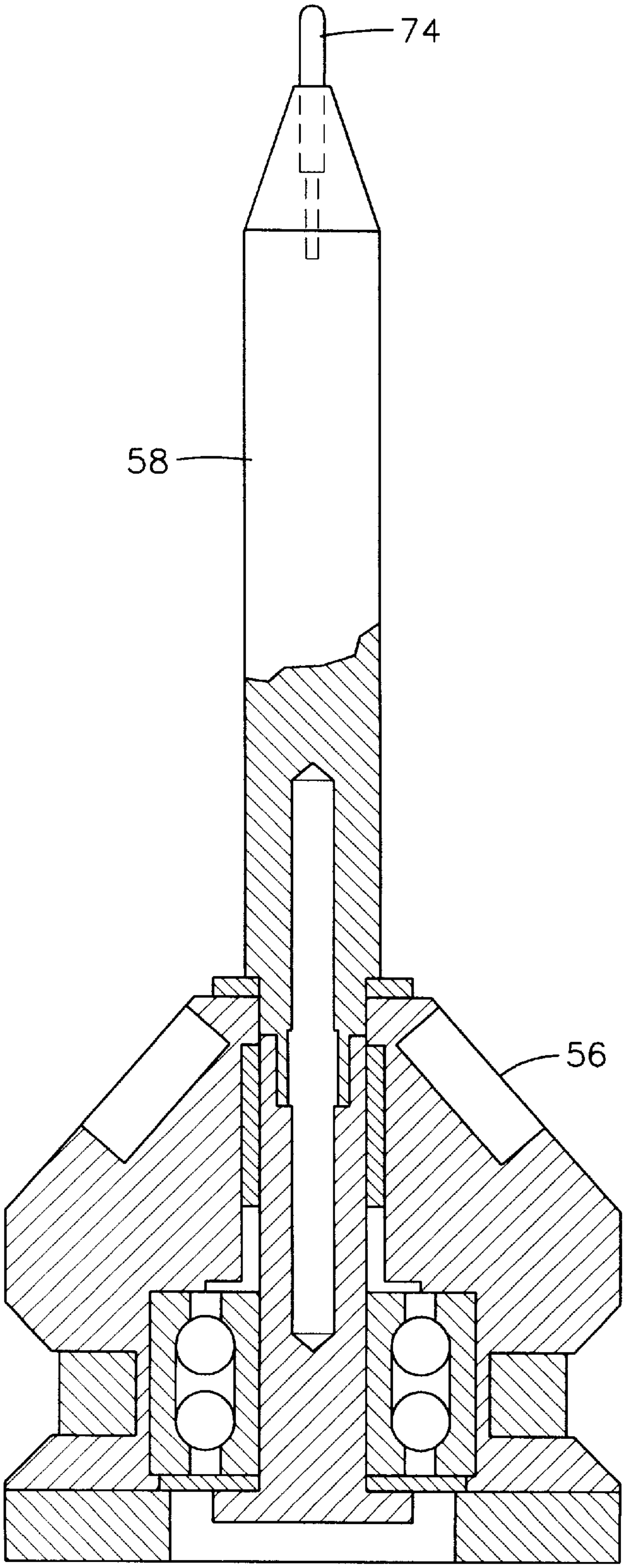
FIG. 8 is an isolated cross-sectional view of a transport puck of the system of the present invention.

As shown in FIGS. 6 and 7, each of the spindles 60 holds a golf ball 25' (indicated by dashed lines) at a tip 68 of each of the plurality of prongs 64. The tips 68 engage the golf ball 25' halfway between a pole of the golf ball 25' and the equator of the golf ball 25'. It is preferable that the contact area with the golf ball 25 be a minimum to avoid tip marks that deter from the appearance of the golf ball 25. Further, during each cycle of the system 20, each spindle 60 accumulates an amount of paint, basecoat or topcoat, that will eventually lead to tip marks or in some other manner interfere with the painting of a golf ball 25 on the system 20. Thus, it is necessary to remove each spindle 60 for cleaning and maintenance after a predetermined number of cycles on the system 20. Removal of the spindles 60 is performed at each of the spindle changing stations 34 and 48 on the system 20. Each transport puck 52 has a unique binary code that is transmitted to a signal receiver at a designated spindle changing station 34 or 48. If the transport puck 52 has been through the portion of the system the predetermined cycles, then the transport puck 52 is off-loaded from the transfer means 22 at the designated spindle changing station 34 or 48 for removal and replacement of its spindles 60. After replacement of its spindles 60, the transport puck 52 is on-loaded to the transport means 22 to cycle through the system 20 again.

Referring again to FIGS. 6 and 7, in a preferred embodiment each spindle 60 has three prongs 64 equally spaced from each other. Each prong 64 extends upward and outward from the base 66 in an arc, then upward at approximately a ninety degree angle, and finally upward and inward at approximately a thirty degree angle relative to the equator of the golf ball 25'. However, those skilled in the pertinent art will recognize that the number of prongs 64 may vary and the structure of each prong may vary without departing from the scope and spirit of the present invention. A United States Golf Association approved golf ball 25 has a diameter of at least 1.680 inches. In the preferred embodiment, the prongs 64 form a phantom diameter 70 (indicated by dashed lines) that is 1.437 inches in diameter. In the preferred embodiment, the height of each spindle 60, from the bottom of the base 66 to the tip 68, is 2.111 inches. Each of the spindles 60 engage the corresponding shaft 58 through mating of a pin 74 projecting from the top of the shaft 58 with a cavity 72 located in the bottom of the base 66. The spindle 60 is also rotated through this mechanism.

Additionally, the tamping device 27 secures each of the golf balls 25 within the spindles 60 at precise levels to hold the golf balls tightly during the processing. The tamping device 27 eliminates or at least reduces the movement of the golf ball 25 during processing thereby resulting in the elimination or at least reduction of tip marks on the golf ball 25.

In a preferred embodiment of the system 20, there are two coating applications, a basecoat application and a topcoat application. However, those skilled in the pertinent art will recognize that the system 20 may have only one coating application or more than two coating applications without departing from the scope and spirit of the present invention. The transfer means 24 has a first track that operates in relation to the first coating application and a second track that operates in relation to the second coating application. The printing of the indicia will have a integral transfer means. In the preferred embodiment, the first coating station 28 and the second coating station 42 are the same except for the coating applied to each of the golf balls 25. Thus, the description of the first coating station 28 will apply equally to the second coating station.

Figure 9:
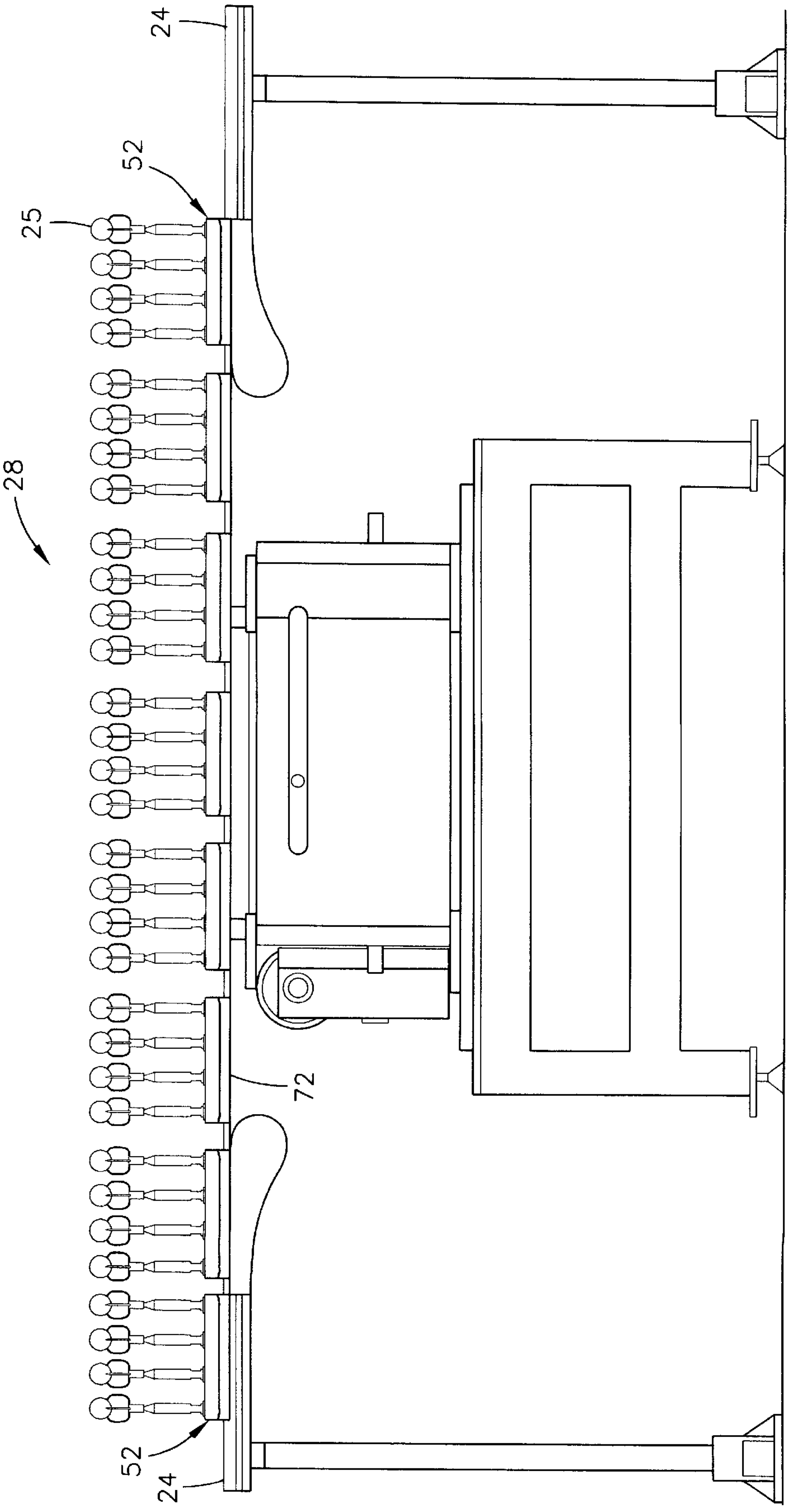
FIG. 9 is an isolated view of the walking beam conveyance system for the coating station of the system of the present invention.
Figure 10:
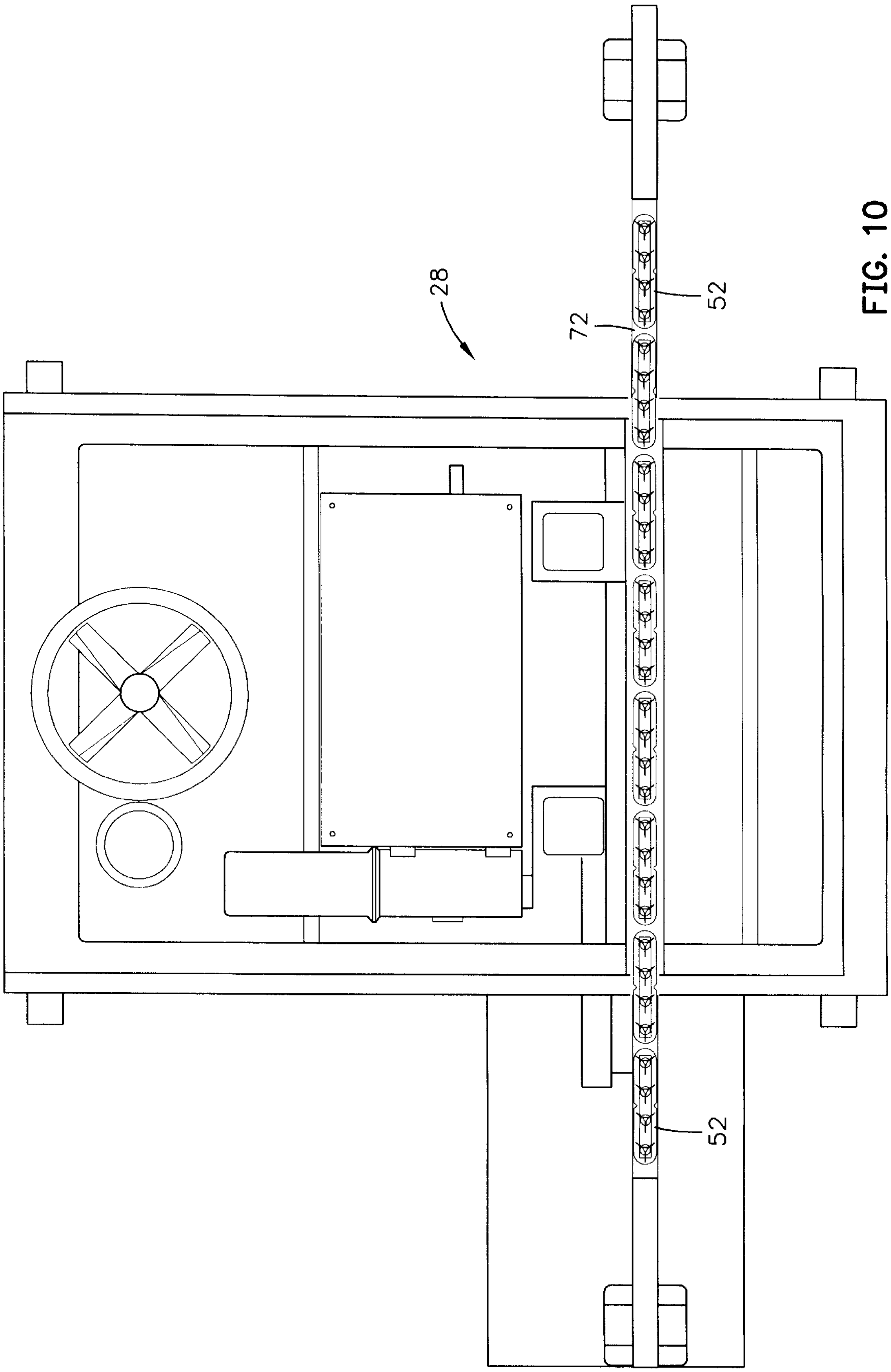
FIG. 10 is a top plan view of FIG. 9.
Figure 11:
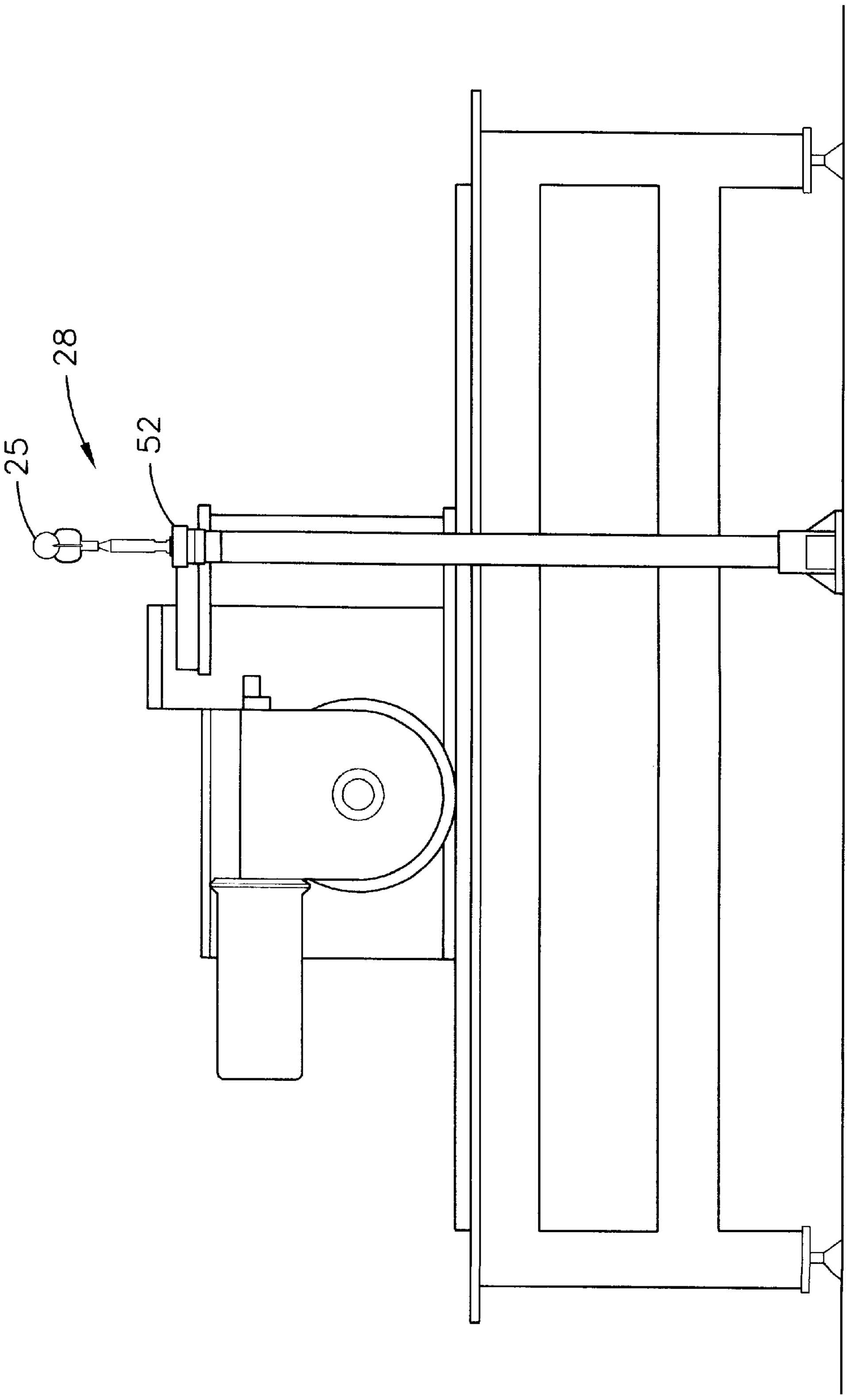
FIG. 11 is a side plan view of FIG. 9.
Figure 12:
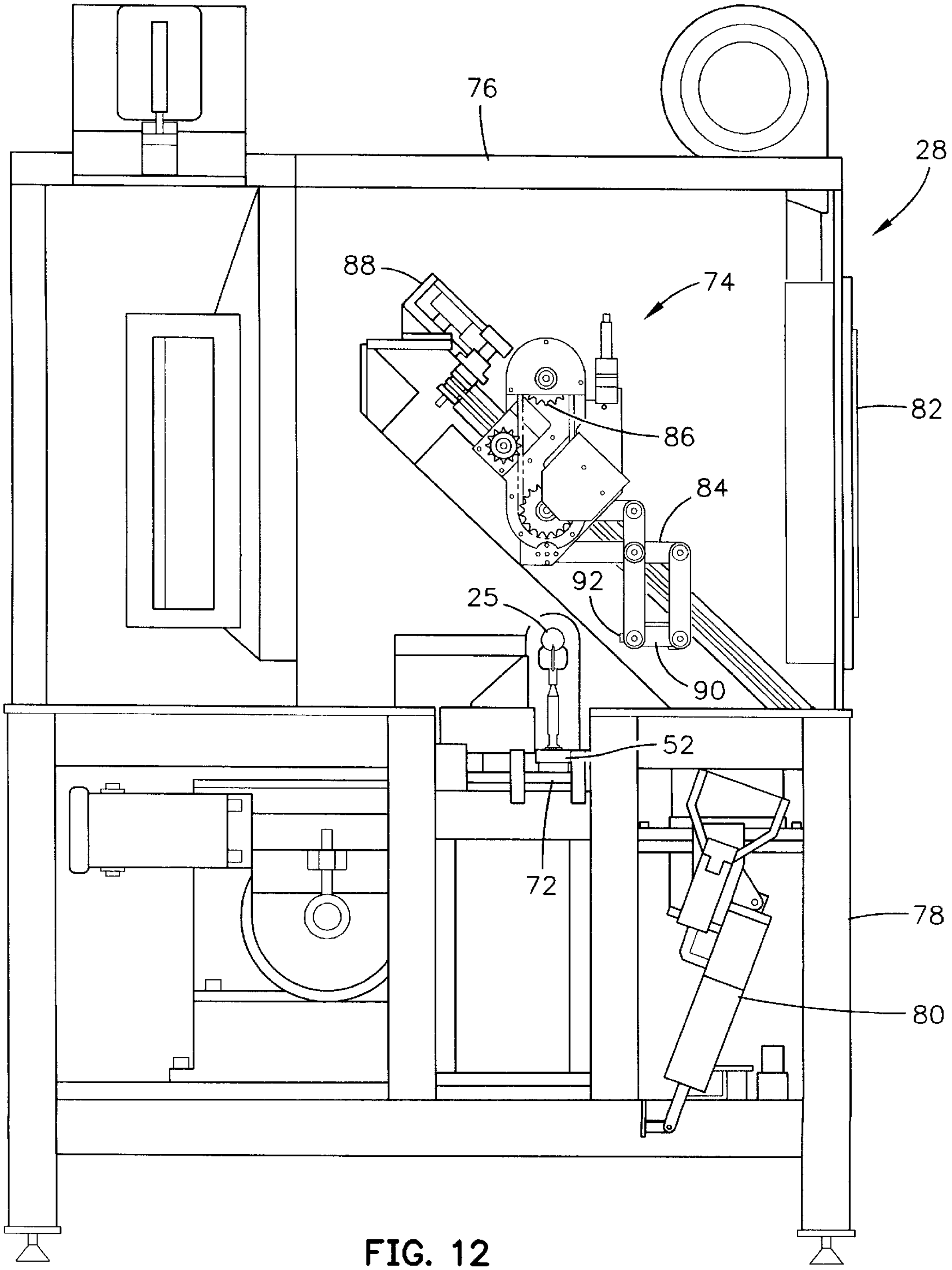
FIG. 12 is an isolated side view of the coating station of the system.
Figure 13:
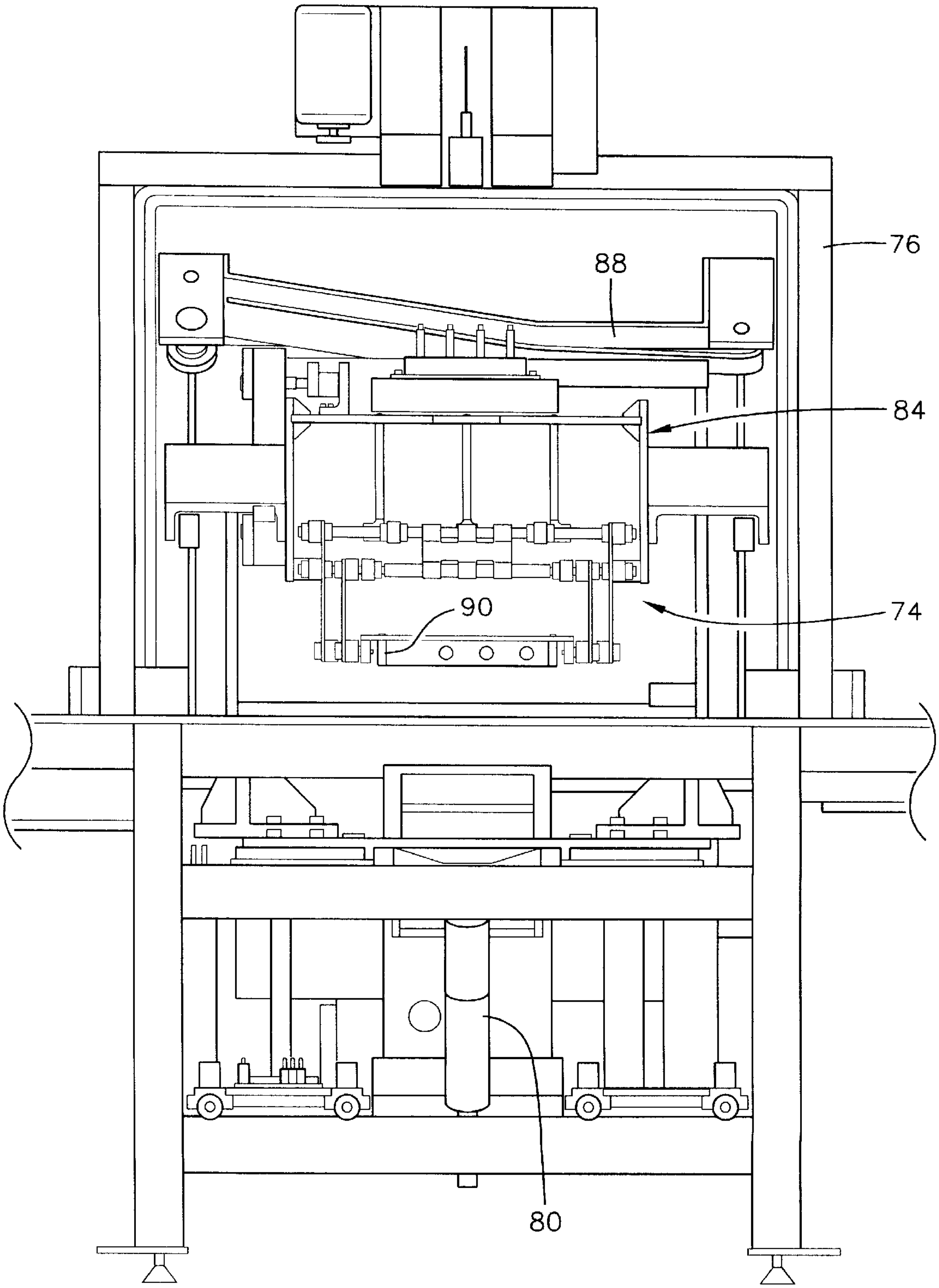
FIG. 13 is a front view of FIG. 12.

As shown in FIGS. 9–11, the golf balls 25 are conveyed through the first coating station 28 while disposed on transport pucks 52. The transfer means 24 conveys each transport puck 52 to a walking beam conveyance system 72 that is an integral component of the first coating station 28. The waling beam conveyance system 72 conveys each of the transport pucks through the first coating station 28, and assists in the rotation of each of the spindles 60. Each spindle 60 rotates at a predetermined rate through the first coating station 28 in order to effectuate the coating of the entire golf ball 25. In a preferred embodiment, each golf ball 25 rotates at a speed of two-hundred rotations per minute as it is coated with the basecoat or topcoat. However, the rotation speed may vary from fifty to five-hundred rotations per minute while the golf ball 25 is still maintained on the spindle 60.

Figure 14:
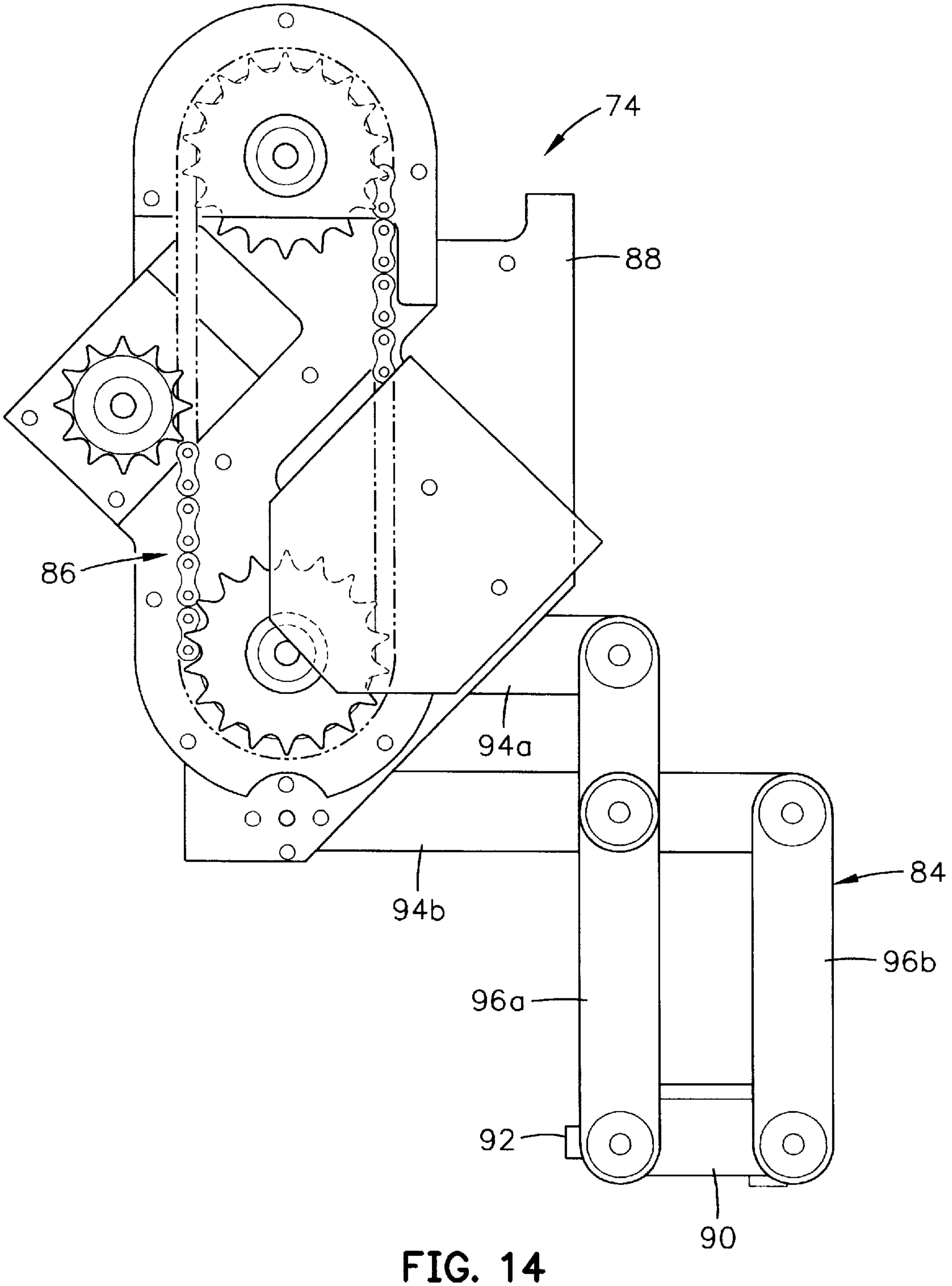
FIG. 14 is an isolated side view of the spray gun mechanism of the system.
Figure 15:
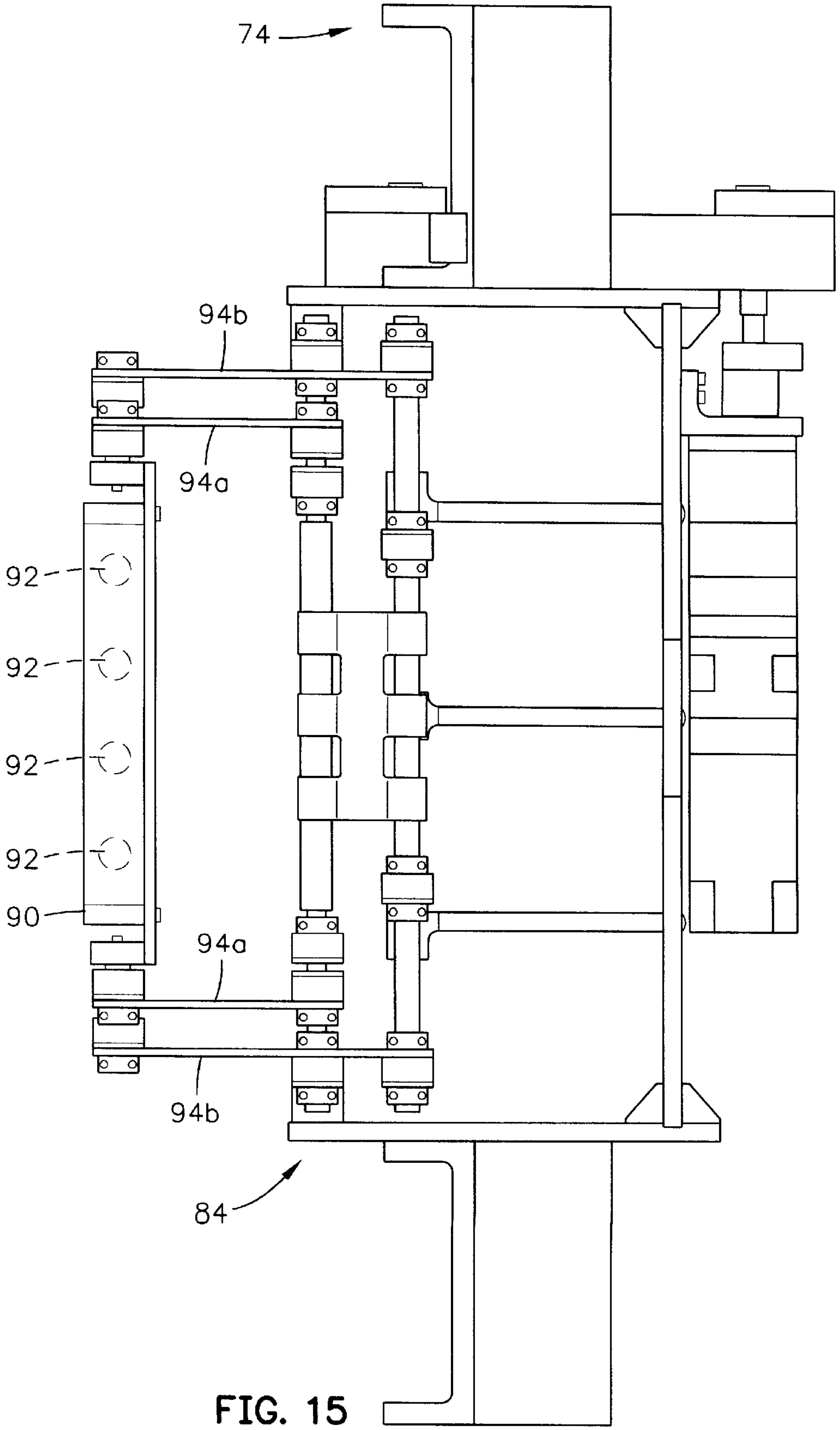
FIG. 15 is a top plan view of FIG. 14.

FIGS. 12–15 illustrate the servo-driven spray gun motion control mechanism 74 of the first coating station 28. The spray gun mechanism 74 is disposed within an enclosed housing 76 of the first coating station 28, and which lies on a base 78. The enclosed housing 76 has a viewing window 82 for monitoring the coating application of each golf ball 25. The spray gun mechanism 74 has an arm mechanism 84 that is driven by a drive mechanism 86, with both the drive mechanism 86 and the arm mechanism 84 mounted on a frame 88. The drive mechanism 86 moves the arm mechanism 84 about the golf balls 25 as the golf balls 25 are conveyed through the enclosed housing 76. In a preferred embodiment, the arm mechanism 84 moves in an arc from below the golf balls 25 to a position above the golf balls 25. As mentioned previously, the golf balls 25 are rotated at a predetermined rate as the arm mechanism 84 moves about the golf balls 25. At the end of the arm mechanism is the spray gun base that holds a plurality of spray guns 92. The spray guns 92 apply the coating to each of the golf balls 25 as each golf ball 25 is rotated in the spindle 60. The shaft 58 ensures that each golf ball 25 is disposed at a sufficient height above the walking beam conveyance system 72 to ensure proper application of the coating on the lower portion of each golf ball 25. The range and speed of the arm mechanism 84 may be adjusted and controlled to maximize transfer efficiency of the coating to the golf ball 25, and to produce an evenly coated golf ball 25 to validate aerodynamic expectations for a particular golf ball dimple pattern. The motion of the arm mechanism 84 may be in an arc ranging from twenty degrees to one-hundred fifty degrees. The spray pattern and the arc-like motion require that the speed of the movement of the arm mechanism 84 vary in order to have proper application of the coating. Thus, the arm mechanism 84 is slower about the equatorial region of the golf balls 25 as opposed to the polar regions of the golf balls 25 to assure precise uniformity and thickness of the coating. As shown in FIGS. 14 and 15, the arm mechanism 84 has a plurality of horizontal links **94*a* and 94*b* and a plurality of vertical links 96*a* and 96*b* that hold and assist in maneuvering the spray gun base 90. The links 94 and 96 allow for the arc-like motion of the spray gun base from below the golf balls 25 to above the golf balls 25. The drive mechanism 86 for the arm 84** may be an AC motor, a servomotor, a robot driver, or the like.

Figure 16:
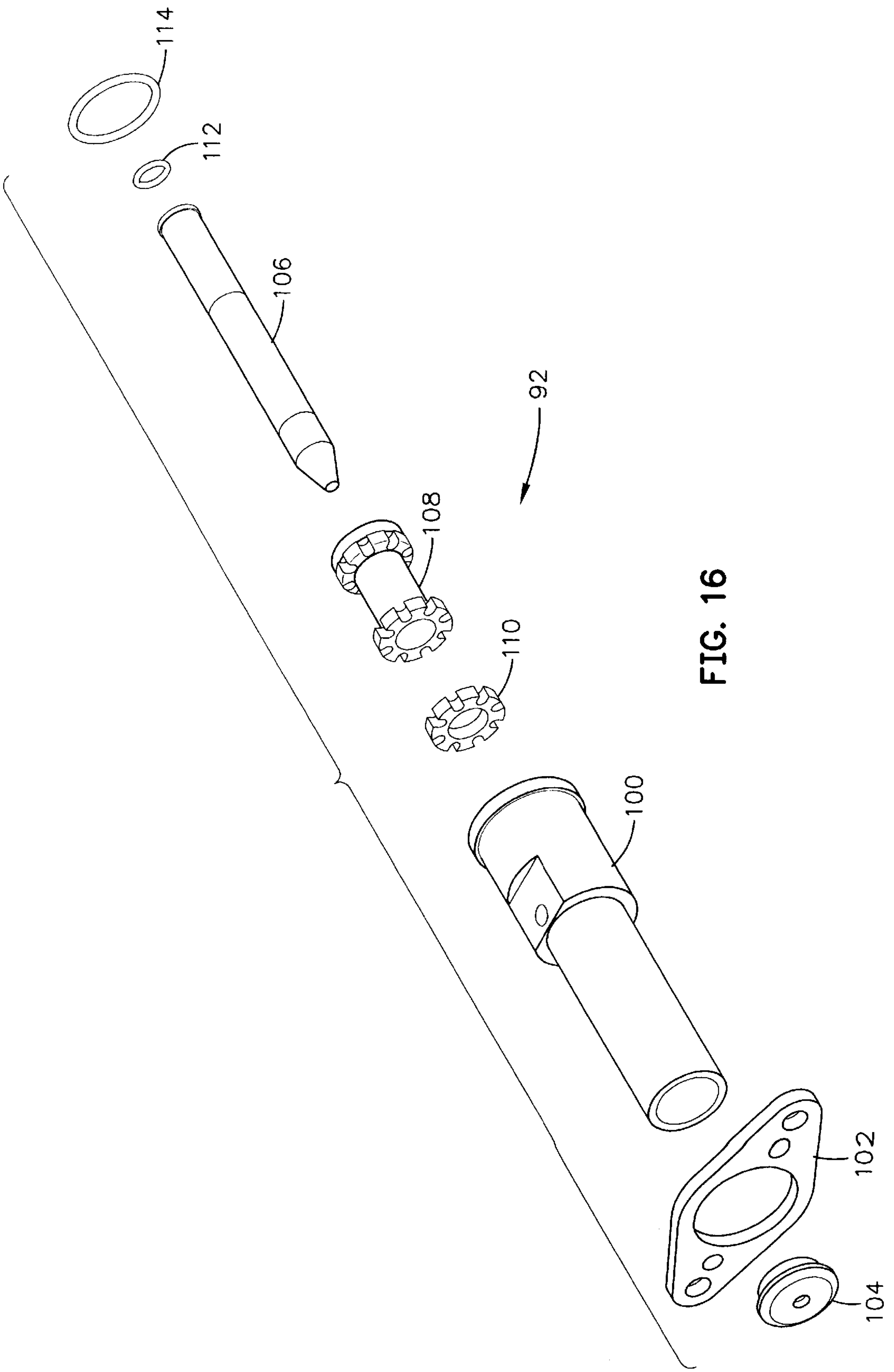

FIG. 16 is an exploded view of a spray gun 92 utilized in the present invention. The spray gun 92 has a body 100, a clamp 102, an air cap 104, a liquid injector 106 having a passageway, a rear insert 108, a front insert 110, a first O-ring 112 and a second 0-ring 114. This construction of each spray gun 92 allows for proper application of the coating to the golf ball 25. The diameter of the passageway of the injector 106 is approximately 0.035 inches. The injector 106 produces a small orifice outflow having a conical spray pattern with a tip atomization pressure of less than ten pounds per square inch. The transfer efficiencies of the spray gun 92 of the present invention are as high as sixty percent as compared to fifteen percent for coating systems of the prior art. The coating fluid is delivered to each spray gun 92 by a corresponding tube, not shown, utilizing gear pumps that precisely regulate the volume of fluid through each spray gun 92. The spray gun mechanism 74 has a gun-purge and tip-clean trough to maintain clear passages and clean nozzles for application of the coating to the golf balls 25. A face spray array cleans the gun nozzle tips and flushes the inner chamber of the guns at regularly programmed intervals. The purge trough contains twelve spray jets that deliver a cleansing solvent for cleaning of the spray guns 92

Figure 17:
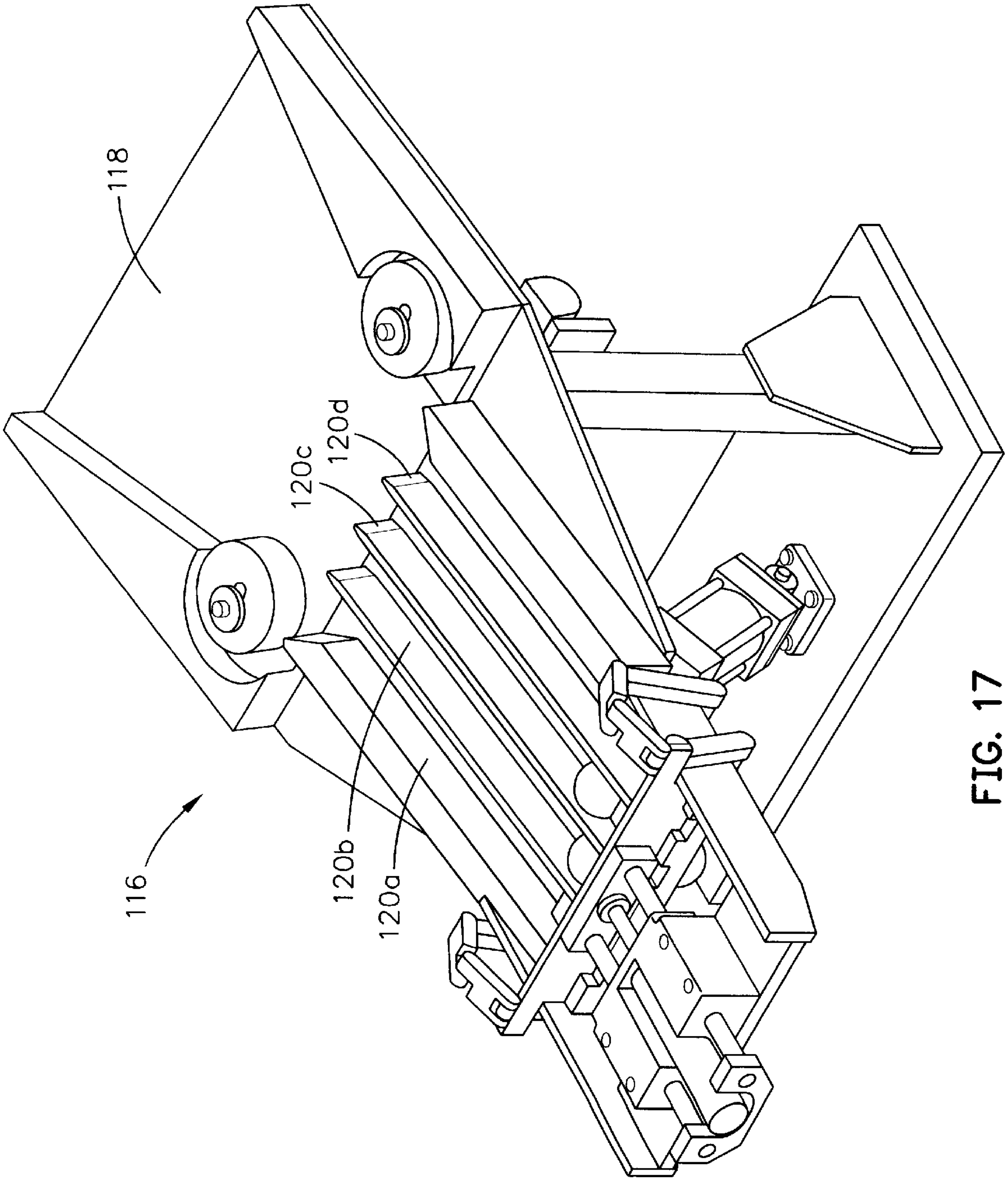
FIG. 17 is an isolated perspective view of a transfer mechanism of the system.

FIG. 17 is a perspective view of a transfer mechanism 116 that is the main component of each of the transfer stations 26 and 40 of the system 20 of the present invention. The transfer mechanism 116 has a central channel 118 for receiving the golf balls from the transfer means 22 or from a station such as the plasma treatment station 24. The central channel is angled to utilize gravity to move the golf balls 25 to a plurality of chutes 120*a–d*. The chutes 120*a–d* distribute the golf balls 25 into transfer groups of a set number for processing or for placement on the transport pucks 52. During off-loading from the transport pucks 52, the system 20 utilizes high pressure de-ionized air to gently remove each golf ball 25 from each corresponding spindle 60 for further processing on the system 20 or for packaging.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A method for coating a series of golf balls, each of the golf balls having a surface, the method comprising:

transferring the golf balls to a coating station, the coating station having a booth with a spray gun assembly within the booth, the spray gun assembly having at least one spray gun;

conveying the golf balls through the coating station along a horizontal line of conveyance;

automatically coating each of the golf balls with a coating through movement of the at least one spray gun about each of the golf balls along an arc from a position below the horizontal line of conveyance of each of the golf balls through the booth to a position above the horizontal line of conveyance of each of the golf balls through the booth;

transferring each of the coated golf balls from the coating station to a curing station; and curing each of the coated golf balls at the curing station.

2. The method according to claim 1 further comprising:

transferring each of the coated golf balls from the curing station to a printing station; and printing an indicia on each of the coated golf balls at the printing station.

3. The method according to claim 2 further comprising:

transferring each of the printed golf balls from the printing station to a second coating station; and coating each of the printed golf balls with a second coating at the second coating station.

4. The method according to claim to 3 further comprising:

transferring each of the dual-coated golf balls from the second coating station to a second curing station; and curing each of the dual-coated golf balls at the second curing station.

5. The method according to claim 4 wherein transferring each of the golf balls comprising placing each of the golf balls in a multiple prong fixture, a predetermined set of each of the multiple prong fixtures attached to a puck for conveyance to and from each of the stations.

6. The method according to claim 4 wherein the method is automatically performed on a single line.

7. The method according to claim 3 wherein the coating is a base coat and the second coating is a top coat.

8. The method according to claim 2 wherein the printing an indicia on each of the golf balls comprises pad printing an indicia on each of the golf balls with an ultraviolet curable ink and ultraviolet curing each of the golf balls.

9. The method according to claim 1 further comprising subjecting each of the golf balls to plasma treatment prior to transferring each of the golf balls to the coating station.

10. The method according to claim 1 wherein coating each of the golf balls comprises:

rotating each of the golf balls about a fixed axis inside of the coating station;

moving the at least one spray gun along a track, the track positioned transverse to the conveyance of the golf balls through the coating station; and spraying the coating from the at least one spray gun to each of the golf balls as the at least one spray gun is moved along the track and as each of the golf balls is rotated about the fixed axis.

11. The method according to claim 10 wherein one end of the track lies on a horizontal plane at or below the conveyance of each of the golf balls and an opposite end lies at a horizontal plane above the conveyance of each of the golf balls.

* * * * *